United States Patent [19]
Sounik et al.

[11] Patent Number: 5,200,481
[45] Date of Patent: Apr. 6, 1993

[54] TETRAAZAPORPHYRIN MONOMERS AND POLYMERS

[75] Inventors: James R. Sounik, Somerset; Jacquelyn Popolo, Old Tappan, both of N.J.; Thomas M. Leslie, Huntsville, Ala.

[73] Assignee: Hoechst Celanese Corp., Somerville, N.J.

[21] Appl. No.: 729,752

[22] Filed: Jul. 15, 1991

[51] Int. Cl.$^5$ .................. C08F 126/06; C09B 69/10
[52] U.S. Cl. ................................. 526/259; 8/647
[58] Field of Search ................................. 526/259

[56] References Cited

U.S. PATENT DOCUMENTS 4,854,676 8/1989 Kalyanaraman et al. .......... 359/243

Primary Examiner—Joseph L. Schofer
Assistant Examiner—Wu C. Cheng
Attorney, Agent, or Firm—Michael W. Ferrell

[57] ABSTRACT

In one embodiment this invention provides polymerizable tetraazaporphyrin dyes, and corresponding polymers which can be formed into thin film optical waveguiding media which exhibit nonlinear optical susceptibility.

13 Claims, No Drawings

TETRAAZAPORPHYRIN MONOMERS AND POLYMERS

This invention was made with Government support under Contract No. F49620-89-C-0097 awarded by the Department of Defense (DOD). The Government has certain rights in this invention.

BACKGROUND OF THE INVENTION

Porphyrins and tetraazaporphyrins are organic materials which have utility in a broad range of applications, such as pigments, laser dyes, photoconductors, optical recording media, and the like.

U.S. Pat. Nos. 4,061,654; 4,622,179; 4,731,312; 4,749,637; 4,766,054; 4,719,613; and 4,725,525 describe novel phthalocyanine and naphthalocyanine type dyes Which are adapted for application in optical recording systems.

U.S. Pat. No. 4,622,174 describes metallo-porphyrin complexes which are proposed for application in transparent protective laser shields.

U.S. Pat. No. 4,657,554 describes water-soluble azaphthalocyanines which are useful as photoactivators in textile bleaching operations.

J. Am. Chem. Soc., 106, 7404 (1984) by Wheeler et al describes the synthesis and characterization of bis(tri-n-hexylsiloxy)(2,3-phthalocyanato)silicon and its dimer.

Poly. Prepr. (Am. Soc., Div. Polym. Chem.) by Moyer et al describes the synthesis of monomeric silicon naphthalocyanine, and conducting cofacial polymers derived from the monomer.

U.S. Pat. No. 4,854,676 describes a bistable optical device comprising a Fabry-Perot etalon which has an optical cavity containing a naphthalocyanine dye medium as a nonlinear optical component.

There is a continuing interest in the development of new and improved porphyrin and tetraazaporphyrin type structures for specialized applications deriving from unique physicochemical and optical properties.

Other technology of background interest with respect to the present invention relates to the field of nonlinear optics which has potential for important applications in optical information processing, telecommunications and integrated optics.

Recently it has been recognized that organic and polymeric materials with large delocalized $\pi$-electron systems can exhibit nonlinear optical response, which in many cases is a much larger response than by inorganic materials.

In addition, the properties of organic and polymeric materials can be varied to optimize other desirable properties, such as mechanical and thermooxidative stability and high laser damage thresholds, with preservation of the electronic interactions responsible for nonlinear optical effects.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

There is increasing research effort to develop new nonlinear optical organic systems for prospective novel phenomena and devices adapted for information control in optical circuitry, and for light valves and optical switches. The potential utility of organic materials with large second order and third order nonlinearities for very high frequency application contrasts with the bandwidth limitations of conventional inorganic electrooptic materials.

Accordingly, it is an object of this invention to provide polymerizable tetraazaporphyrin compounds which exhibit a novel combination of physical and optical properties.

It is another object of this invention to provide a thin film medium consisting of a tetraazaporphyrin polymer which exhibits nonlinear optical response.

It is a further object of this invention to provide a waveguiding optical medium for light modulation, comprising a thin film of a novel phthalocyanine and/or naphthalocyanine containing polymer.

Other objects and advantages of the present invention shall become apparent from the accompanying description and examples.

DESCRIPTION OF THE INVENTION

One or more objects of the present invention are accomplished by the provision of a polymerizable tetraazaporphyrin dye which corresponds to the formula:

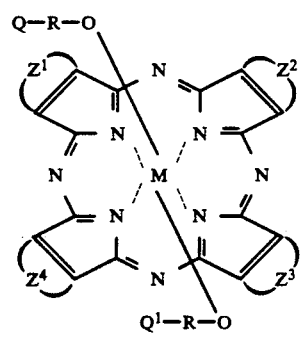

where Q is a polymerizable unsaturated aliphatic, alicyclic or aromatic substituent containing between about 2–20 carbon atoms; $Q^1$ is an aliphatic, alicyclic or aromatic substituent containing between about 1–20 carbon atoms, or a polymerizable unsaturated aliphatic, alicyclic or aromatic substituent containing between about 2–20 carbon atoms; M is a coordinated silicon, germanium or tin atom; $Z^1$, $Z^2$, $Z^3$ and $Z^4$ individually are one of the following structures:

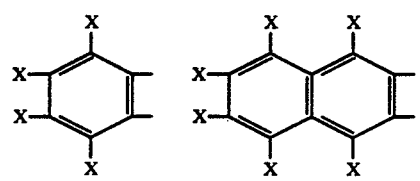

where X is hydrogen, halogen or an aliphatic, alicyclic or aromatic substituent containing 1–12 carbon atoms;

and R is a divalent aliphatic, alicyclic or aromatic substituent containing between about 2-20 carbon atoms.

In another embodiment this invention provides a polymerizable tetraazaporphyrin dye which corresponds to the formula:

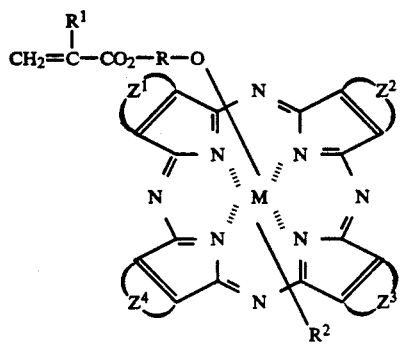

where R is a divalent aliphatic, alicyclic or aromatic substituent containing between about 2-20 carbon atoms; $R^1$ is hydrogen or a $C_1$-$C_4$ alkyl substituent; $R^2$ is an aliphatic, alicyclic or aromatic substituent containing between about 1-20 carbon atoms; and M, $Z^1$, $Z^2$, $Z^3$ and $Z^4$ are as previously defined.

In another embodiment this invention provides a polymerizable tetraazaporphyrin dye which corresponds to the formula:

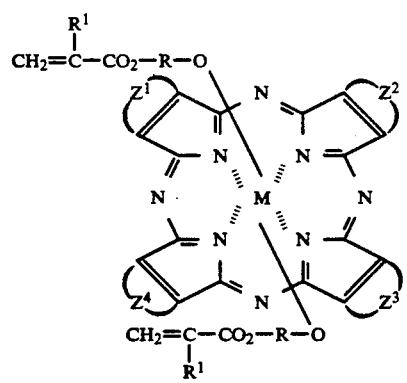

where R, $R^1$, M, $Z^1$, $Z^2$, $Z^3$ and $Z^4$ are as previously defined.

In another embodiment this invention provides a polymerizable tetraazaporphyrin dye which corresponds to the formula:

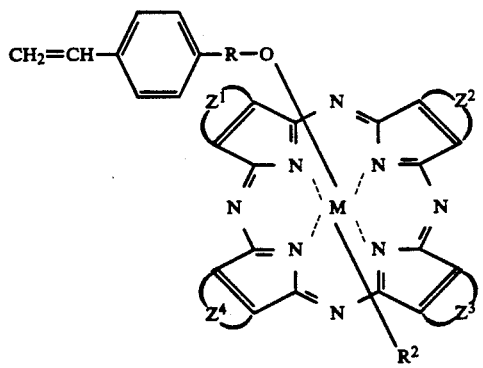

where R, $R^2$, M, $Z^1$, $Z^2$, $Z^3$ and $Z^4$ are as previously defined.

In another embodiment this invention provides a polymerizable tetraazaporphyrin dye which corresponds to the formula:

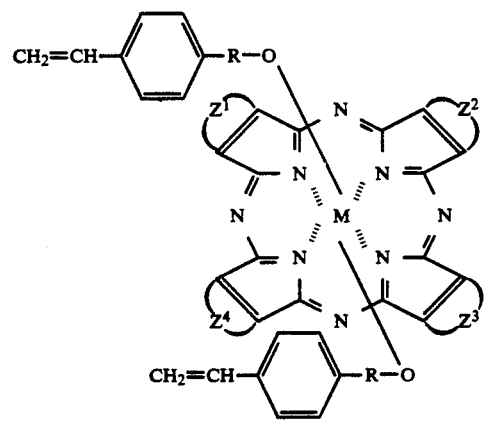

where R, M, $Z^1$, $Z^2$, $Z^3$ and $Z^4$ are as previously defined.

In another embodiment this invention provides a tetraazaporphyrin dye in accordance with Formula I which is contained as recurring polymerized monomeric units in a polymer. A present invention polymer can be in the form of a thin film optical waveguiding medium which exhibits second order or third order nonlinear optical susceptibility.

Illustrative of invention tetraazaporphyrin dye polymers are the following structures in which n is an integer with a value of at least 5, and the other substituent designations are as previously defined:

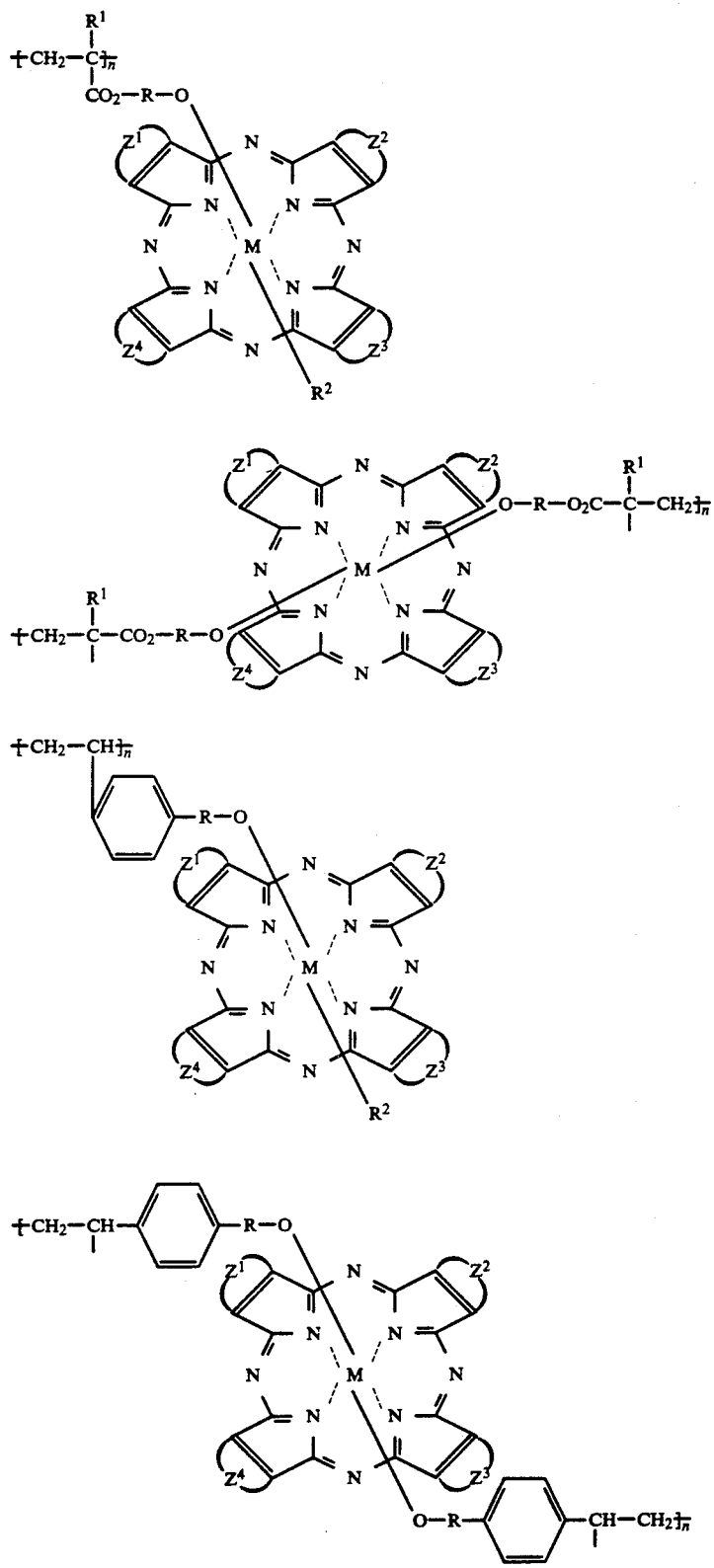
In another embodiment this invention provides a copolymer which is characterized by recurring monomeric units corresponding to the formula:

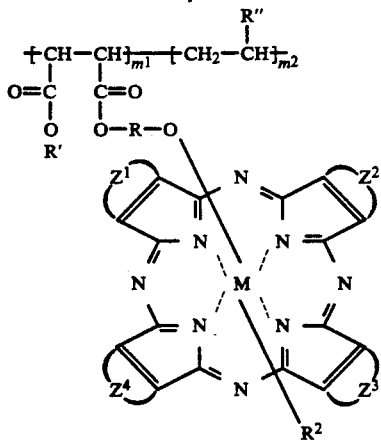

where $m^1$ and $m^2$ are integers which total at least 10, and the $m^1$ monomer comprises between about 10–50 mole percent of the total $m^1+m^2$ monomeric units; R' is hydrogen or a $C_1$–$C_{10}$ hydrocarbon substituent; R" is hydrogen or a $C_1$–$C_4$ alkoxyl or $C_6$–$C_{12}$ aromatic substituent; and R, $R^2$, M, $Z^1$, $Z^2$, $Z^3$ and $Z^4$ are as previously defined.

In the structural formulas represented herein, the divalent R radical can be alkylene, oxyalkylene, oxyphenylene, polyestero, polyamido, polyorganosiloxyl, and the like.

The X substituent in the formulas is selected from groups which include chlorine, $C_1$–$C_{12}$ alkyl, $C_1$–$C_{12}$ alkoxy, $C_1$–$C_{12}$ alkoxythio, $C_1$–$C_{12}$ oxyalkylene, $C_2$–$C_{12}$ alkenyl, estero, sulfonamido, organosiloxy, cyclopentyl, phenyl, alkoxyphenyl, alkenylphenyl, halophenyl, nitrophenyl, naphthyl, pyridyl, pyrimidyl, furyl, piperidyl, piperizyl, and the like.

$R^1$ in the formulas can be hydrogen, methyl, ethyl, propyl, n-butyl, and the like.

The $R^2$ substituent in the formulas is selected from $C_1$–$C_{20}$ alkyl, $C_1$–$C_{20}$ alkoxy, cyclopentyl, phenyl, alkoxyphenyl, pyridyl, furyl, and the like, and organosiloxy substituents such as trialkylsiloxy.

R' in the formulas can be hydrogen or a $C_1$–$C_{10}$ hydrocarbyl substituent such as methyl, ethyl, butyl, hexyl, cyclohexyl, phenyl, tolyl, and the like.

R" in the formulas can be hydrogen or a $C_1$–$C_4$ alkoxyl or $C_6$–$C_{12}$ aromatic substituent such as methoxy, ethoxy, propoxy, butoxy, phenyl, alkoxyphenyl, halophenyl, naphthyl, pyridyl, and the like.

Polymers of the present invention which exhibit good solubility in organic solvents and excellent film forming properties are those in which M in the formulas is silicon, and R is a divalent organosiloxyl or polyorganosiloxyl substituent.

The invention monomers and many of the polymers are soluble in a wide variety of organic solvents, such as tetrahydrofuran, cyclohexanone, benzene, pyridine, quinoline, dimethylformamide, chloroform, and the like.

A present invention polymer can vary from essentially a homopolymer of recurring polymerized tetraazaporphyrin monomeric units to a copolymer which contains less than 20 mole percent of tetraazaporphyrin monomeric units, based on the total moles of polymerized comonomers.

Illustrative of vinyl monomers which can be copolymerized with a tetraazaporphyrin monomer or monomer mixture are acrylonitrile, methacrylonitrile, alkyl acrylate or methacrylate, alkyl vinyl ether, maleic anhydride, vinyl halide, vinyl alkylate, styrene, α-alkylstyrene, 4-acyloxystyrene, alkene, alkadiene, and the like.

The content of monomeric tetraazaporphyrin chromophore structures in a polymer directly influence polymer properties such as solubility in solvents, glass transition temperature, thermal stability, and the like.

A present invention tetraazaporphyrin monomer can be either monofunctional or difunctional with respect to the number of polymerizable groups in the monomer. As the molar ratio of tetraazaporphyrin difunctional monomer in a comonomer mixture increases, the degree of crosslinking between the polymer molecules increases. The difunctional copolymers can vary from a thermoplastic polymer with a low content of recurring and crosslinked difunctional tetraazaporphyrin units and with high solubility in organic solvents, to a thermoset-like copolymer with a high content of recurring and crosslinked tetraazaporphyrin units and low solubility in organic solvents.

Copolymers with a tetraazaporphyrin monomer content of about 5–25 mole percent typically will have a weight average molecular weight in the range between about 5000–200,000 and exhibit a glass transition temperature $T_g$ in the range of about 60°–250° C. These properties are directly dependent on the type and number of different recurring comonomeric structures in the copolymer.

A present invention tetraazaporphyrin polymer in the form of an optical medium can have an external field-induced noncentrosymmetric molecular orientation, and exhibit second order nonlinear optical susceptibility.

The term "external field" as employed herein refers to an electric, magnetic or mechanical stress field which is applied to a substrate of mobile organic molecules, to induce dipolar alignment of the molecules parallel to the field.

In a preferred embodiment an invention thin film optical waveguide medium consists of a copolymer which is characterized by an external field-induced noncentrosymmetric orientation of the axial tetraazaporphyrin structures, and which exhibits second order nonlinear optical susceptibility $\chi^{(2)}$. It is essential that the recurring tetraazaporphyrin units have an inherent structural asymmetry, in order to induce second order nonlinear optical susceptibility in an optical medium with an external field. Illustrative of an inherent structural asymmetry is a formula polymer in which $Z^1$ is benzo and $Z^2$, $Z^3$ and $Z^4$ are naphthalo substituents.

A film or coating formed with a present invention polymer initially exhibits third order nonlinear optical susceptibility. A thin film optical waveguide medium of the present invention after fabrication can be subjected to an external field to orient and align uniaxially the structurally asymmetric tetraazaporphyrin units of the polymer. In one method the polymer medium is heated to close to or above the polymer glass transition temperature $T_g$, then an external field (e.g., a DC electric field) is applied to the medium of mobile polymer molecules to induce uniaxial molecular alignment of the tetraazaporphyrin units parallel to the applied field, and the medium is cooled while maintaining the external field effect.

By this method a present invention thin film optical waveguide medium has a stable uniaxial alignment of polymer tetraazaporphyrin units. The poled optical medium exhibits a second order nonlinear optical susceptibility $\chi^{(2)}$. A present invention poled thin film optical medium is capable of exhibiting a $\chi^{(2)}$ level of $1\times 10^{-9}$ esu or higher as measured at 1.34 μm excitation wavelength.

A present invention polymer readily forms into a nonlinear optical medium, such as a transparent film or coating on a supporting substrate. A polymer can be applied to a supporting substrate by conventional means, such as spin coating, spraying, Langmuir-Blodgett deposition, and the like.

Preparation Of Tetraazaporphyrin Monomers And Polymers

A general procedure for the synthesis of invention monomers and polymers is exemplified by the following reaction scheme for a diacrylate:

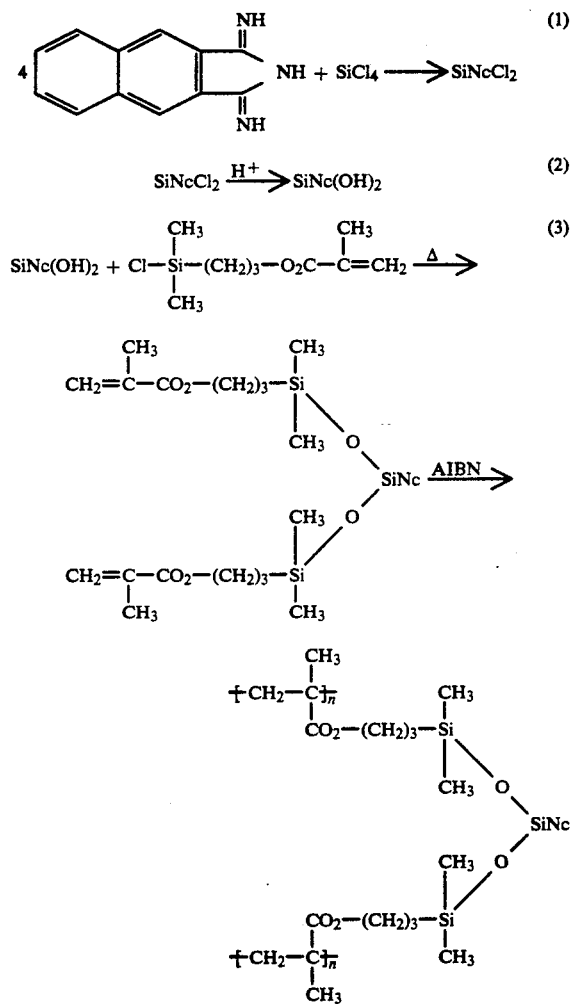

In another embodiment this invention provides a process for producing a mixture of tetraazaporphyrin dyes which comprises reacting 1,3-diiminoisoindoline with 1,3-diiminobenz[f]-isoindoline in a molar ratio of about 0.5–1.5:1 at a temperature in the range between about 40°–250° C. in a solvent medium containing a metallizing reagent, wherein the dye substituents of the product mixture have different structures respectively corresponding to those represented in Formula I.

A dye mixture produced by the reaction of 1,3-diiminoisoindoline with 1,3-diiminobenz[f]-isoindoline and a metallizing reagent is composed of six different macrocyclic compounds as corresponding to the combinations of benzo and/or naphthalo structures $Z^1$, $Z^2$, $Z^3$ and $Z^4$ in Formula I.

The solvent medium normally will be an organic solvent such as tetrahydrofuran, quinoline or pyridine, and a typical metallizing reagent is silicon tetrachloride. Depending on the selected reactants and reaction conditions, the reaction period normally will vary in the range between about 0.5–5 hours.

After the reaction period is completed, the dye product can be separated by precipitating the product from solution by cooling and/or by the addition of a dilutent such as methanol. The metallized dye is reacted further with an appropriate reagent having a polymerizable vinyl group, in the manner represented in the reaction scheme above.

Detailed descriptions of methods for the synthesis of tetraazaporphyrin dyes are set forth in U.S. Pat. No. 4,854,676, and in copending patent application Ser. No. 333,526, filed Apr. 4, 1989.

As noted previously, polymers of the present invention can be dissolved in a solvent and utilized for the preparation of thin film coatings on selected substrates. A thin film in the form of a channel waveguide is characterized by a high concentration of tetraazaporphyrin chromophores, and is adapted for utility as a superior nonlinear optical medium for modulation of waveguided light.

Because of the highly extended conjugated double bond electronic configuration provided by the multiple isoindoline and/or benzoisoindoline structures, a tetraazaporphyrin dye exhibits an exceptional degree of nonlinear optical susceptibility. This has the beneficial effect of imparting a high optical efficiency to light modulation systems, such as a Fabry-Perot device in which an invention polymeric thin film is utilized as the nonlinear optical medium in the optical cavity.

The following examples are further illustrative of the present invention. The components of the present invention are presented as being typical, and various modifications can be derived in view of the foregoing disclosure within the scope of the invention.

EXAMPLE I

This Example illustrates the preparation of polymerizable phthalocyanine dyes, and the preparation of copolymers.

A. Bis(3-methacryloxypropyldimethylsiloxy)silicon phthalocyanine

A mixture of dihydroxysilicon phthalocyanine (1.9 g, 2.5 mmoles), 3-methacryloxypropyldimethylchlorosilane (4.0 g, 18.1 mmoles) and dry pyridine (43 mL) is stirred at 50° C. for 72 hours. The solution is cooled and diluted with a 1:1 mixture of ethanol and water (100 mL). The suspension formed is filtered and the solid is washed with a 1:1 ethanol/water mixture (50 mL), Vacuum dried (80° C., 1 torr), and weighed 1.6 g, 1.8 mmoles, 71%): mp 170°–172° C.; IR (Nujol) 1714 (s, C=O), 1335 (s), 1158 (s), 1123 (s), 1080 (s), 1043 (s, Si-O-Si), 737 (s); NMR (CDCl₃) δ ppm 9.65 (m, 2,3-PcH), 8.34 (m, 1,4-PcH), 5.75 (s, C=CH), 5.41 (s, C=CH), 2.73 (t, CH₂), −0.95 m, CH₂), 2.23 (m, CH₂), −2.84 (s, SiCH₃).

The material is a violet blue microcrystalline solid which is soluble in chloroform, toluene, hexanes, methylenechloride, and dimethylsulfoxide.

B. 5:95 Silicon phthalocyanine methyl methacrylate copolymer

A mixture of bis(methacryloxypropyldimethylsiloxy)silicon phthalocyanine (0.52 g, 0.55 mmole), methylmethacrylate (10.1 mL, 94.4 mmoles), and dry chlorobenzene (50 mL) is heated to 70° C. while being purged with dry argon gas. To this solution, azodiisobutyronitrile (AIBN) (0.32 g) is added. The solution is stirred at 70° C. for 48 hours and then cooled to room temperature. The copolymer is precipitated into methanol (500 mL), and the solid is isolated by filtration. The solid is washed with methanol (250 mL), air dried, and weighed (8.234 g, 0.45 mmole; 82% yield based on silicon phthalocyanine): $T_g$, 124° C.; IR (Nujol) 1730 (s, C=O), 1192 (s), 742 (m); NMR CDCl$_3$ δ ppm 9.6 (m, 2,3-PcH), 8.3 (m, 1,4-PcH), −0.95 (m, CH$_2$), −2.23 (m, CH$_2$), −2.84 (s, SiCH$_3$).

The copolymer is a light blue amorphous powder which is soluble in common organic solvents such as cyclohexanone, N-methylpyrrolidinone, toluene and chloroform. Analysis of the polymer by size exclusion chromatography in tetrahydrofuran indicates an average molecular weight of 166,000.

C. 10:90 Silicon phthalocyanine methyl methacrylate copolymer

A mixture of bis(methacryloxypropyldimethylsiloxy)silicon phthalocyanine (0.54 g, 0.57 mmole), methylmethacrylate (5.2 mL, 48.6 mmoles), and dry chlorobenzene (39 mL) is heated to 70° C. while being purged with dry argon gas. AIBN (0.167 g) is added and the solution is stirred at 70° C. for 48 hours and then cooled to room temperature. The copolymer is precipitated into methanol (400 mL), and the solid is isolated by filtration. The solid is washed with methanol (50 mL), vacuum dried (80° C., 1 torr), and weighed (4.22 g, 0.45 mmoles, 78% yield based on silicon phthalooyanine): $T_g$, 130° C.; IR (Nujol) 1730 (s, C=O), 1192 (s), 1149 (s), 742 (m); NMR (CDCl$_3$) δ ppm 9.6 (m, 2,3-PcH), 8.3 (m, 1,4-PcH), −0.95 (m, CH$_2$), −2.23 (m, CH$_2$), −2.84 (s, SiCH$_3$).

The copolymer is a light blue amorphous powder which is soluble in common organic solvents such as cyclohexanone, N-methylpyrrolidinone, toluene and chloroform. Analysis of the polymer by size exclusion chromatography in tetrahydrofuran indicates an average molecular weight of 307,000.

D. Bis(3-methacryloxypropyldimethylsiloxy) germanium naphthalocyanine

Following the above described procedures, bis(3-methacryloxypropyldimethylsiloxy)germanium naphthalocyanine is prepared by the reaction of dihydroxygermanium naphthalocyanine with 3-methacryloxypropyldimethylchlorosilane in pyridine at 70° C.

E. 5:95 Germanium naphthalocyanine butyl methacrylate copolymer

Following the above described polymerization procedures, a 5:95 germanium naphthalocyanine methyl methacrylate copolymer is prepared by the reaction of bis(3-methacryloxypropyldimethylsiloxy)germanium naphthalocyanine and butyl methacrylate in chlorobenzene.

EXAMPLE II

This Example illustrates the preparation of polymerizable phthalo/naphthalocyanine dye mixtures with a 1:3 mole ratio of isoindoline reactants in accordance with the present invention, and the preparation of a copolymer.

A. Dichlorosilicon benzophthalocyanine

A mixture of 1,3-diiminoisoindoline (0.878 g, 6.05 mmoles), 1,3-diiminobenz(f)isoindoline (3.463 g, 17.74 mmoles), silicon tetrachloride (2.76 mL, 24.11 mmoles) and azeotropically distilled quinoline (100 mL) is refluxed for 1.5 hours. The reaction medium suspension is cooled and filtered to separate the solid phase. After washing with methanol and vacuum drying, a 3.276 g yield of a green solid is obtained, which gives a positive Beilstein test.

B. Dihydroxysilicon benzophthalocyanine

In the manner previously described, a mixture of dichlorosilicon benzophthalocyanine (1:3 mole ratio) (3.276 g) and concentrated sulfuric acid (50 mL) is stirred at room temperature for 3 hours. The reaction medium is poured onto ice, and the resulting suspension is filtered, and the separated solid is washed with water and then dried.

The recovered solid is mixed with pyridine (50 mL) and concentrated ammonium hydroxide (5 mL), and the mixture is refluxed for 1.5 hours. The resulting suspension is filtered, and the isolated solid is washed with methanol and then dried to yield 6.089 g of a bright green product which gives a negative Beilstein test for halogen.

C. Bis(methacryloxypropyldimethylsiloxy)silicon benzophthalocyanine (1:3 mole ratio)

A mixture of dihydroxysilicon benzophthalocyanine (1:3 mole ratio) (6.0 g), 3-methacryloxypropyldimethylchlorosilane (16 g), tributylamine (5 mL), and azeotropically distilled 3-picoline (100 mL) is refluxed for 4 hours. The reaction medium is filtered hot (medium frit), and the filtrate is concentrated under reduced pressure.

The liquid concentrate is diluted with ethanol/water (1:1), and the formed suspension is filtered to isolate the solid phase. The solid is washed with ethanol and vacuum dried at room temperature for 14 hours to yield about 5.0 g of product.

A portion (1.0 g) of the solid product is purified by column chromatography (alumina III, wet loaded, hexanes-toluene 4:1). The purified product is a bright blue-green solid which is soluble in chloroform, methylene chloride, and toluene, and is slightly soluble in hexanes and acetone.

D. 30:70 Benzophthalocyanine/ethyl acrylate copolymer

Following the polymerization procedures described in Example I, bis(3-methacryloxypropyldimethylsiloxy)silicon benzophthalocyanine (0.6 mmole) and ethyl acrylate (1.5 mmoles) in chlorobenzene are polymerized, and the copolymer is recovered by precipitation. The weight average molecular weight of the copolymer is about 300,000.

EXAMPLE III

This Example illustrates the synthesis of monoacrylate and diacrylate silicon phthalocyanine dyes, and the preparation of copolymers.

A. Bis(tri-n-hexylsiloxy) silicon phthalocyanine

A mixture of tri-n-hexylsilanol (14.9 g), sodium methoxide (2.67 g) and absolute ethanol (50 mL) is concentrated to an oil under vacuum. The oil is added to a mixture of dichlorosilicon phthalocyanine (15.10 g) and distilled 1,2,4-trimethylbenzene (70 mL). The resulting suspension is refluxed for one hour, and filtered while hot (whatman #54). The filtrate is cooled to room temperature, and then diluted with methanol (350 mL). The solid which formed is isolated by filtration, washed with methanol (100 mL), vacuum dried at room temperature, and weighed (22.06 g, 79%): mp 175° C. (Lit [1] 175° C.); IR (Nujol) 1525 (s), 1325 (s), 1125 (s), 1080 (s), 1038 (s, Si—O—Si), 725 (s).

B. Hydroxy (tri-n-hexylsiloxy) silicon phthalocyanine

This procedure is a modification of a procedure described by Batzel [2].

A mixture of the above compound (15.05 g), trichloroacetic acid (6.27 g) and distilled dried toluene (120 mL) is refluxed for one hour. The resulting solution is concentrated under vacuum, then is added to a mixture of 5:1 pyridine/water (60 mL) and stirred for 2 hours at 62° C. The suspension which formed is concentrated under vacuum and diluted with methanol (100 mL). The solid is isolated by filtration, washed with methanol (100 mL), dried under vacuum at room temperature, and weighed (9.45 g, 84%): IR (Nujol) 3500 (w, OH), 1340 (s), 1125 (s), 1037 (m, Si—O—Si), 740 (s).

C. (3-Methacryloxypropyldimethylsiloxy) (tri-n-hexylsiloxy) silicon phthalocyanine A mixture of hydroxy(tri-n-hexylsiloxy)silicon phthalocyanine (4.43 g), 3-methacryloxypropyldimethylchlorosilane (3.43 g), tri-n-butylamine (2.88 g) and distilled dried toluene (100 mL) is stirred at room temperature for 48 hours. The solution is concentrated under vacuum, and then diluted with methanol. The solid is isolated by filtration, dried under vacuum at room temperature, and weighed (4.30 g, 80%): mp 120° C.; IR (Nujol) 1714 (s, C=O), 1336 (s), 1250 (m, SiCH$_3$), 1158 (s), 1123 (s), 1081 (s), 1044 (s, Si—O—Si), 736 (s); $^1$H NMR δ 9.66 m, Pc-H), 8.34 (m, Pc-H), 5.75 (s, C=CH$_2$), 5.41 (s, C=CH$_2$), 2.74 (t, γ-CH$_2$, C3 chain), 1.74 (s, CH$_3$), 0.79 (m, ε-CH$_2$), 0.67 (t,CH$_3$), 0.36 (m, δ-CH$_2$), −0.02 (m, γ-CH$_2$, C6 chain), −0.99 (m, β-CH$_2$, C3 chain), −1.27 (m, β-CH$_2$, C6 chain), −2.27 (m, α-CH$_2$, C3 chain), −2.43 (m, α-CH$_2$, C6 chain), −2.84 (s, SiCH$_3$).

D. Bis(3-methacryloxypropyldimethylsiloxy) silicon phthalocyanine

A mixture of dihydroxysilicon phthalocyanine (2.10 g), 3-methacryloxypropyldimethylohlorosilane (3.09 g) and distilled dried pyridine (75 mL) is stirred at 50° C. for 48 hours. The mixture is filtered, and the filtrate is diluted with a 1:1 ethanol/water solution (100 mL). The solid which formed is isolated, washed with methanol (50 mL), vacuum dried at room temperature, and weighed (2.96 g, 86%). The solid is recrystallized from toluene: mp 170°-172° C.; IR (Nujol) 1714 (s, C=O), 1336 (s), 1250 (m, SiCH$_3$), 1158 (s), 1123 (s), 1081 (s), 1044 (s, Si—O—Si), 736 (s); $^1$H NMR δ 9.65 (m, Pc-H), 8.34 (m, Pc-H), 5.75 (s, C=CH), 5.41 (s, C=CH), 2.73 (t, γ-CH$_2$), 1.73 (s, CH$_3$), −0.95 (m, β-CH$_2$), −2.23 (m, α-CH$_2$), −2.84 (s, SiCH$_3$).

E. General copolymerization procedure

Silicon phthalocyanine monomer, methyl methacrylate and dry distilled chlorobenzene are purged with argon for two hours while being heated. AIBN (3 to 5 mole percent) is added and the reaction medium is heated for 48 to 72 hours under an inert atmosphere. The copolymer product is precipitated into methanol, and the solid is isolated by filtration, vacuum dried at 50° C. and weighed. The yields generally are greater than 70% based on the silicon phthalocyanine monomer.

Monoacrylate and diacrylate silicon phthalocyanine dye copolymer preparations are summarized in the Table.

TABLE

Silicon Phthalocyanine/MMA Copolymers

| Monomer | Reaction Temp (°C.) | Comp.[1] | Comp.[2] (NMR) | T$_g$ (°C.) | Molecular Weight |
|---|---|---|---|---|---|
| bisacrylate | 70 | 10:90 | 10.9:89.1 | 130 | 307,000 |
| bisacrylate | 70 | 5:95 | 5.5:94.5 | 112 | 192,000 |
| bisacrylate | 70 | 1:95 | 1.4:98.6 | 121 | 41,000 |
| monoacrylate | 70 | 10:90 | 9:91 | 117 | 99,000 |
| monoacrylate | 60 | 20:80 | 18:82 | 87 | 24,000 |
| monoacrylate | 60 | 30:70 | 25:75 | 73 | 20,000 |
| monoacrylate | 60 | 40:60 | 40:60 | 82 | 25,000 |
| monoacrylate | 60 | 60:40 | 56:44 | 97 | 25,000 |

[1]Composition of monomers in reaction as weight percent. (wt Pc:wt MMA)
[2]Composition of copolymer as analyzed by integration of NMR as weight percent. (wt Pc:wt MMA)

References
[1] B. Wheeler, G. Nagasubramanian, A. Bard, L. Schectman, D. Dinniny, M. Kenney, J. Am. Chem. Soc., 1984, 106, 7404.
[2] D. Batzel, PhD. Thesis, Case Western Reserve University, 1990.

What is claimed is:

1. A tetraazaporphyrin dye of the formula I, the residue of which is contained as recurring polymerized monomeric units in a polymer, and the polymer has a T$_g$ in the range of about 60°-250° C.

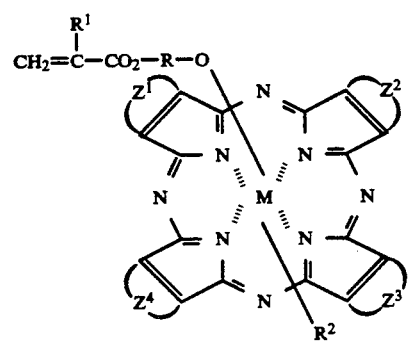

where M is a coordinated silicon, germanium or tin atom; $Z^1$, $Z^2$, $Z^3$ and $Z^4$ individually are one of the following structures:

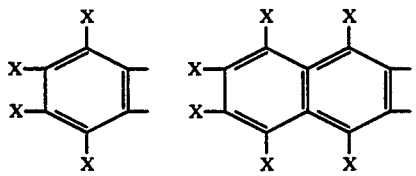

where X is hydrogen, halogen or an aliphatic, alicyclic or aromatic substituent containing 1-12 carbon atoms; R is a divalent aliphatic, alicyclic or aromatic substituent containing between about 2-20 carbon atoms; $R^1$ is hydrogen or a $C_1$-$C_4$ alkyl substituent; and $R^2$ is an aliphatic, alicyclic or aromatic substituent containing between about 1-20 carbon atoms.

2. A tetraazaporphyrin dye in accordance with claim 1 which is contained as recurring monomeric units that are copolymerized with at least one vinyl monomer.

3. A tetraazaporphyrin dye in accordance with claim 1 which is contained as recurring monomeric units that are copolymerized with at least one alkyl acrylate, alkyl methacrylate, styrene, α-alkylstyrene or 4-acyloxystyrene monomer, and wherein the recurring dye monomeric units comprise between about 5-90 mole percent of the copolymer, based on the total moles of monomers.

4. A tetraazaporphyrin dye of the formula II, the residue of which is contained as recurring polymerized monomeric units in a polymer, and the polymer has a $T_g$ in the range of about 60°-250° C.

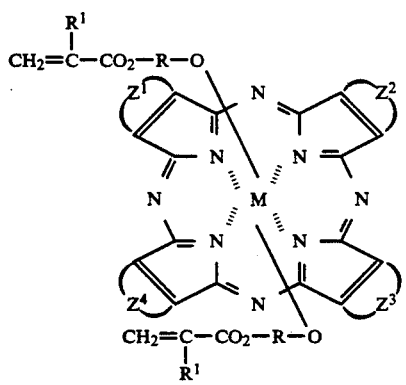

where M is a coordinated silicon, germanium or tin atom; $Z^1$, $Z^2$, $Z^3$ and $Z^4$ individually are one of the following structures:

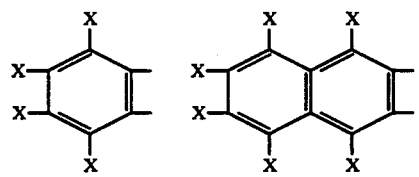

where X is hydrogen, halogen or an aliphatic, alicyclic or aromatic substituent containing 1-12 carbon atoms; R is a divalent aliphatic, alicyclic or aromatic substituent containing between about 2-20 carbon atoms; and $R^1$ is hydrogen or a $C_1$-$C_4$ substituent.

5. A tetraazaporphyrin dye in accordance with claim 4 which is contained as recurring monomeric units that are copolymerized with at least one vinyl monomer.

6. A tetraazaporphyrin dye in accordance with claim 4 which is contained as recurring monomeric units that are copolymerized with at least one alkyl acrylate, alkyl methacrylate, styrene, α-alkylstyrene or 4-acyloxystyrene monomer, and wherein the recurring dye monomeric units comprise between 5-90 mole percent of the copolymer, based on the total moles of monomers.

7. A tetraazaporphyrin dye of the formula III, the residue of which is contained as recurring polymerized monomeric units in a polymer, and the polymer has a $T_g$ range of about 60°-250° C.

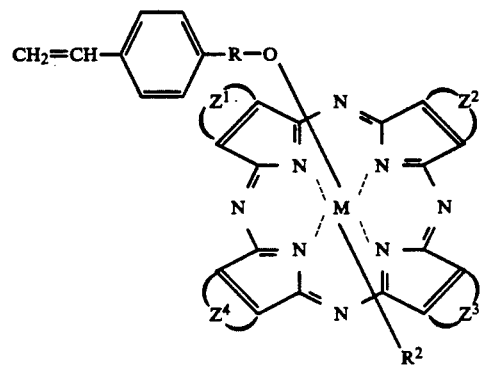

wherein M is a coordinated silicon, germanium or tin atom; $Z^1$, $Z^2$, $Z^3$ and $Z^4$ individually are one of the following structures:

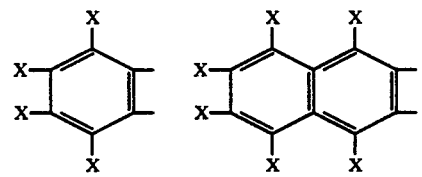

where X is hydrogen, halogen or an aliphatic, alicyclic or aromatic substituent containing 1-12 carbon atoms; R is a divalent aliphatic, alicyclic or aromatic substituent containing between about 2-20 carbon atoms; and $R^2$ is an aliphatic, alicyclic or aromatic substituent containing between about 1-20 carbon atoms.

8. A tetraazaporphyrin dye in accordance with claim 7 which is contained as recurring monomeric units that are copolymerized with at least one vinyl monomer.

9. A tetraazaporphyrin dye in accordance with claim 7 which is contained as recurring monomeric units that are copolymerized with at least one alkyl acrylate, alkyl methacrylate, styrene, α-alkylstyrene or 4-acyloxystyrene monomer, and wherein the recurring dye monomeric units comprise between about 5-90 mole percent of the copolymer, based on the total moles of monomers.

10. A tetraazaporphyrin dye of the formula IV, the residue of which is contained as recurring polymerized monomeric units in a polymer, and the polymer has a $T_g$ in the range of about 60°-250° C.

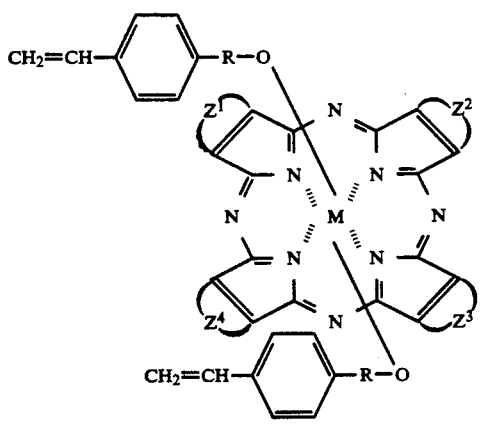

where M is a coordinated silicon, germanium or tin atom; $Z^1$, $Z^2$, $Z^3$ and $Z^4$ individually are one of the following structures:

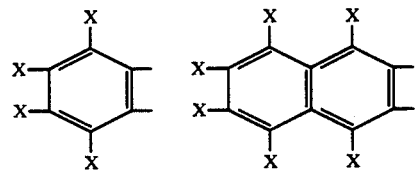

where X is hydrogen, halogen or an aliphatic, alicyclic or aromatic substituent containing 1-12 carbon atoms; and R is a divalent aliphatic, alicyclic or aromatic substituent containing between about 2-20 carbon atoms.

11. A tetraazaporphyrin dye in accordance with claim 10 which is contained as recurring monomeric units that are copolymerized with at least one vinyl monomer.

12. A tetraazaporphyrin dye in accordance with claim 10 which is contained as recurring monomeric units that are copolymerized with at least one alkyl acrylate, alkyl methacrylate, styrene, α-alkylstyrene or 4-acyloxystyrene monomer, and wherein the recurring dye monomeric units comprise between about 5-90 mole percent of the copolymer, based on the total moles of monomers.

13. A copolymer which is characterized by recurring monomeric units corresponding to the formula:

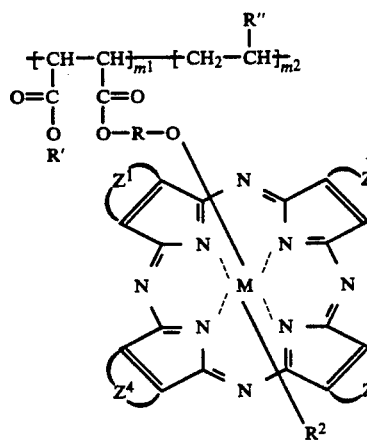

where $m^1$ and $m^2$ are integers which total at least 10, and the $m^1$ monomer comprises between about 10-50 mole percent of the total $m^1 + m^2$ monomeric units; R' is hydrogen or a $C_1$-$C_{10}$ hydrocarbon substituent; R" is hydrogen or a $C_1$-$C_4$ alkoxyl or $C_6$-$C_{12}$ aromatic substituent; M is a coordinated silicon, germanium or tin atom; $Z^1$, $Z^2$, $Z^3$ and $Z^4$ individually are one of the following structures:

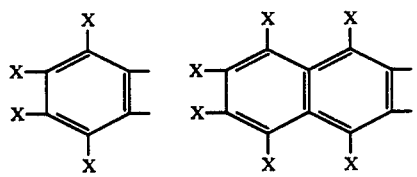

where X is hydrogen, halogen or an aliphatic, alicyclic or aromatic substituent containing 1-12 carbon atoms; R is a divalent aliphatic, alicyclic or aromatic substituent containing between 2-20 carbon atoms; and $R^2$ is an aliphatic, alicyclic or aromatic substituent containing between about 1-20 carbon atoms.

* * * * *